3,075,931
VULCANIZABLE RUBBER COMPOSITION CONTAINING AS A REINFORCING AGENT, A PARTIAL POLYVALENT METAL SALT OF COAL DERIVED HUMIC ACIDS
William L. Davidson, Princeton, Paul E. Levesque, Hamilton Square, and Harold K. Latourette, Pennington, N.J., assignors to FMC Corporation, a corporation of Delaware
Filed Oct. 2, 1959, Ser. No. 843,967
8 Claims. (Cl. 260—17.4)

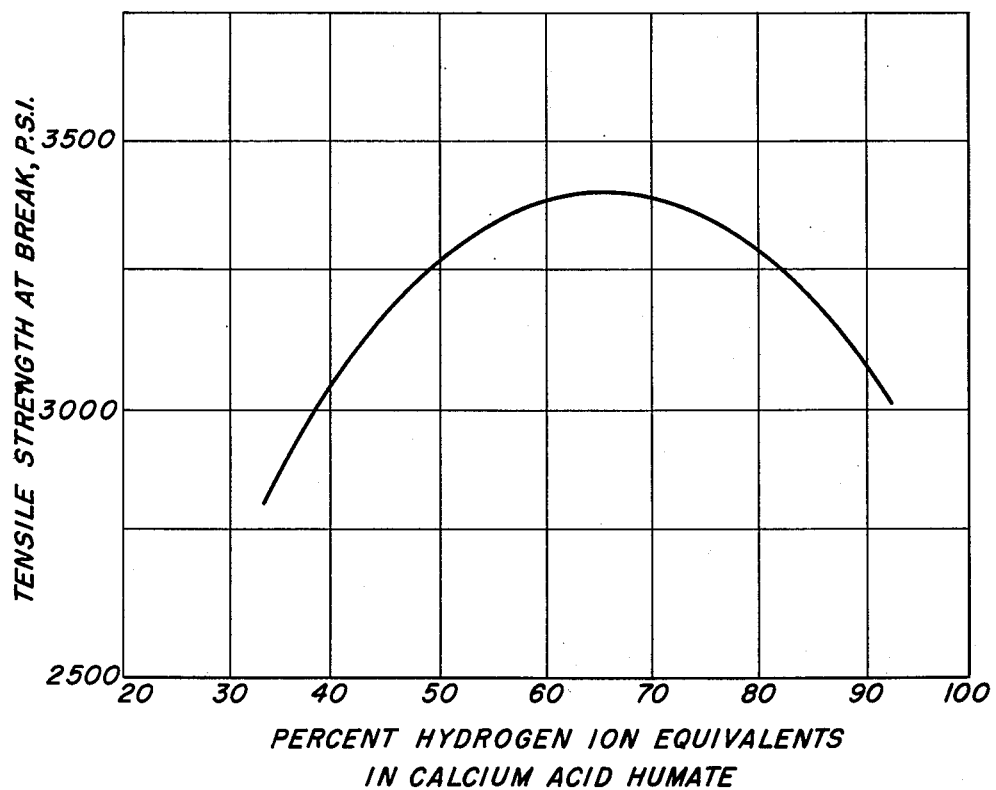
PERCENT HYDROGEN ION EQUIVALENTS
IN CALCIUM ACID HUMATE
INVENTORS
WILLIAM L. DAVIDSON
PAUL E. LEVESQUE
HAROLD K. LATOURETTE
BY
ATTORNEY United States Patent Office 3,075,931
Patented Jan. 29, 1963

This invention relates to improved rubbers, and particularly to natural and synthetic rubbers which are filled and reinforced with certain salts of humic acids. This application is a continuation-in-part of copending application Serial No. 626,463, filed December 5, 1956, now abandoned.

There have been several attempts in the past to use humic acids and humates as rubber reinforcing agents. However, prior to the discovery described herein, there were no methods for providing humate-reinforced rubbers of properties equal or superior to those obtained with commercial reinforcing agents such as carbon black.

It has now been discovered that, when certain acid salts of coal-derived humic acids are employed as fillers for natural and synthetic rubbers, reinforced products are obtained whose tensile strengths and other physical properties are unexpectedly superior to those obtained heretofore from humic acids or their salts, and in fact comparable with those exhibited by rubbers reinforced with carbon black. Not only effective reinforcement, but substantially more economical reinforcement than that obtained with carbon black, is obtained from the products of this invention. Acid salts of polyvalent metal humates, and particularly the acid salts of calcium, aluminum and barium humates, when employed as fillers for natural and synthetic rubbers, provide not only tensile strengths comparable with or superior to those obtained with carbon black, but also excellent abrasion resistance and substantial economic advantages.

The term "humic acid" has been applied to every acidic solid obtained from plant and animal decomposition, regardless of the source or the process of formation. It is known that humic acids from different sources vary in their properties and reactions, although some humic acids do show similarities to those from related sources. The humic acids and humates preferred for use in the instant invention are derived from coals. By the controlled oxidation of coals, most of the organic matter present may be converted into humic acids. The process preferred for the preparation of humic acids for use in this invention is the air oxidation of coals, although they may also be prepared by other oxidative means, such as oxygen, ozone, or nitric acid oxidation. The humic acids produced are hard, black, brittle solids, essentially insoluble in water and the common organic solvents, including acetone, dioxane, petroleum solvents, chlorinated hydrocarbons, etc. These humic acids are organic molecules with molecular weights in the range of about 700–1400 and equivalent weights of about 150–350. The structure is believed to be that of a condensed, carbocyclic nucleus, mostly aromatic in ntaure, with carboxylic acid groups attached either to the nucleus or to short aliphatic side chains. Hydroxyl groups are usually present, and may be either aliphatic or phenolic or both. Almost all salts of these acids are also insoluble, with a few exceptions such as the sodium, potassium and ammonium salts.

The acid salts (also called partial salts) of these humic acids, which have been discovered to be very effective rubber-reinforcing agents, in contrast with the total salts or the free acids, must be formed from those metal ions which ordinarily form insoluble humates. Partial salts of the alkali metals, or ammonium salts, do not produce humates of comparable qualities; nor do total salts of either the soluble or insoluble humates. Among the acid salts preferred for use in this invention are those of the alkaline earths, such as barium, calcium and magnesium, and other acid salts of polyvalent metals, such as those of manganese, aluminum, iron, cobalt, tin, chromium, nickel, copper, lead, zinc and the like. Mixtures of salts may also be used to impart particular properties. Particularly effective reinforcement is obtained from partial salts of aluminum, calcium and barium, and mixtures thereof, said partial salts containing about 50% to 80% hydrogen ion equivalents for maximum effectiveness.

The rubbers or elastomers used herein may be any of the natural or synthetic rubbers commonly used for tire manufacture. The most widely used synthetic rubber is GR–S rubber, also called SBR. This rubber may be prepared by the aqueous emulsion copolymerization of 1,3-butadiene with styrene, by well known techniques wherein the synthetic rubber-forming monomers are emulsified in water with surface active agents and the emulsion is polymerized in the presence of suitable catalysts and regulators. The resulting SBR latex is coagulated and the polymer separated and dried, following which it is compounded with additives, including reinforcing agents, normally by the "dry-milling" technique. The SBR latex may also be compounded with additives, including reinforcing agents, before coagulation. The process of mixing additives with latex followed by coagulation of both polymer and additives with coagulating agents such as acids and/or salts is called "latex masterbatching."

The synthetic rubbers or elastomers used herein may also be polymers obtained by polymerization of other 1,3-butadienes, such as isoprene, piperylene, 2,3-dimethylbutadiene, chloroprene or other homologs or analogs of 1,3-butadiene, or their copolymers with other monomers such as styrene, isobutylene, diisobutylene, acrylonitrile, methyl methacrylate, methyl acrylate, methyl vinyl ether, methyl vinyl ketone and other unsaturated esters, ethers and ketones.

The partial salts of this invention may be combined with the rubber in any of the known ways for incorporating fillers into rubber stocks. The partial salts may be formed in the situs of a rubber latex, for example by adding a soluble humate to the latex followed by addition of the desired amount of acid and the appropriate cation. This technique is commonly described as latex masterbatching. Masterbatching may also be effected by precipitating humic acid from a soluble humate dissolved in the latex with acid, and subsequently adding the desired cation during milling, whereby the acid humate is formed at that stage of the processing. There are of course a variety of techniques which have been and are used to mix fillers, reinforcing agents, pigments, and other substances with rubbers, the blending being accomplished in various stages of rubber production, from the polymerization of the monomers in producing a synthetic elastomer, to the final milling steps. The essential requirement is that of achieving an intimate and highly dispersed mixture of additives with the rubber.

The acidity of the partial humate salt formed is readily varied by adjusting the relative amounts of cation and acid used. In the masterbatching technique, for example, precipitating agents containing various concentrations of acid stronger than humic acid, and the desired multivalent salt, may be used. There is an optimum ratio of hydrogen to metallic ion, which may vary with the particular metal used, at which ratio properties are observed far superior to those obtained from either the humic acid or the metal humate alone. This is strikingly shown in the attached drawing, which depicts the relation between tensile strength and the ratio of hydrogen to calcium ions in vulcanized rubbers reinforced with calcium acid humates. Maximum reinforcement is seen at about 65% hydrogen ion equivalents, dropping off significantly as the proportion of hydrogen ion is either decreased or increased. This same type of optimum reinforcing effect is seen in other rubber properties, such as tear resistance, abrasion resistance and modulus.

The following examples illustrate the preferred procedures for manufacturing reinforced rubbers according to this invention. Parts are by weight unless otherwise noted.

EXAMPLE I

Humic acids were prepared by the fluid bed air-oxidation of coal, by passing heated air through powdered coal maintained at a temperature of 200–240° C. The crude humic acids produced had an equivalent weight of 176. These humic acids were refluxed with the stoichiometric amount of aqueous sodium hydroxide. This solution was used to prepare a reinforced rubber containing 50 parts reinforcing agent per 100 parts rubber, as follows: Three hundred thirty-two parts of 7.12% aqueous sodium humate solution was mixed with 110 parts of latex containing 39.8% butadiene-styrene copolymer made by aqueous emulsion polymerization of a charge ratio of 70% butadiene and 30% styrene, polymerized to 60% conversion and concentrated to about 60% solids, to yield a latex having a Mooney viscosity of 70. To this was added, with vigorous stirring, 50 parts of an aqueous solution containing 8.31 parts of 12 N hydrochloric acid and 2.53 parts of calcium chloride. Precipitation occurred at once. The coagulate was diluted, separated from water, washed and air-dried. A masterbatch was compounded according to the following recipe:

|   | Parts |
|---|---|
| Coagulate of latex-acid humate | 150.0 |
| Circo light oil | 15.0 |
| Zinc oxide | 5.0 |
| Sulfur | 2.0 |
| Mercaptobenzothiazoledisulfide | 2.0 |
| Stearic acid | 1.5 |

Mixing of the components was accomplished on a conventional rubber mill, followed by curing for 100 minutes at 292° F. The product had the following physical properties:

| Shore hardness | 57 |
|---|---|
| Creep | 52 |
| 300% modulus, p.s.i. | 1140 |
| Tensile at break, p.s.i. | 3710 |
| Elongation at break, percent | 610 |

The above procedure was repeated in a series of experiments, employing a number of different ratios of calcium ion and hydrogen ion. The average tensile strengths of the products obtained is shown in graphic form in the accompanying drawing. It is seen that optimum reinforcement is obtained at about 65% hydrogen ion equivalents in the calcium acid humate, with good results observed over a range of about 50% to 80% hydrogen ion equivalents. These results were comparable with a control sample of GR–S reinforced with carbon black, and far superior to those observed using either humic acids or humates which were not partial salts.

EXAMPLE II

The butadiene-styrene copolymer latex described in Example I was reinforced with an aluminum acid humate containing 30% hydrogen ion equivalents, as follows: 1600 parts of this latex containing 320 parts of copolymer (Mooney viscosity=50) was mixed with 2060 parts of aqueous sodium humate, prepared as in Example I from humic acid of equivalent weight 168, said humate solution containing 175 parts of sodium humate. This is equivalent to 160 parts of humate calculated as the desired aluminum acid humate salt. After thorough mixing for 10–15 minutes, the latex and aluminum acid humate were coagulated by adding 500 parts of an aqueous solution containing 0.787 gram-equivalent of aluminum chloride and 0.337 gram-equivalent of hydrochloric acid. After filtration, washing and drying the stock was compounded according to the following recipe:

|   | Parts |
|---|---|
| Latex/humate coagulate | 150.0 |
| Circo light oil | 8.0 |
| Diethylene glycol | 3.0 |
| Zinc oxide | 5.0 |
| Stearic acid | 1.5 |
| Sulfur | 2.5 |
| Mercaptobenzothiazoledisulfide | 2.0 |
| Cumate | 0.3 |

The ingredients were mixed in the above order on a Farrel-Birmingham rubber mill whose rolls were maintained at 120° F. and rotated at 20 and 30 feet per minute respectively. Total milling time was 20 minutes. The stock was then cured at 300° F. in a 30 ton hydraulic press. Several different cures were run ranging from 20 to 200 minutes, to find the optimum cure time. Optimum cure was obtained after 100 minutes. The cured sample had the following properties:

| Tensile strength | p.s.i. | 1,930 |
|---|---|---|
| 300% modulus | p.s.i. | 1,410 |
| Elongation at break | percent | 390 |

EXAMPLE III

A butadiene-styrene rubber reinforced with an aluminum acid humate containing 50% hydrogen ion equivalents was prepared, following the general procedure of Example II, as follows: 1668 parts of the SBR latex prepared as described in Example I and containing 320 parts of copolymer was mixed with 2080 parts of aqueous sodium humate prepared as in Example I, said solution containing 176 parts of sodium humate. This is equivalent to 160 parts of humate calculated as the desired aluminum acid salt. The latex and the aluminum acid humate were then coagulated by adding 500 parts of solution containing 0.567 gram-equivalent each of aluminum chloride and hydrochloric acid. After filtration, washing and drying the stock was compounded and cured, following the procedure and recipe given in Example II. Optimum properties were obtained after a 200-minute cure, as follows:

| Tensile strength | p.s.i. | 3,090 |
|---|---|---|
| 300% modulus | p.s.i. | 1,750 |
| Elongation at break | percent | 470 |

EXAMPLE IV

A butadiene-styrene rubber reinforced with an aluminum acid humate containing 65% hydrogen ion equivalents was prepared, following the general procedure of Example II, as follows: 1600 parts of the butadiene-styrene copolymer latex described in Example I and containing 320 parts of copolymer was mixed with 2090 parts of aqueous sodium humate, prepared as in Example I from humic acid of equivalent weight 168, said humate solution containing 178 parts of sodium humate. This is equivalent to 160 parts of humate calculated as the desired aluminum acid humate salt. After thorough mixing for 10–15 minutes, the latex and aluminum acid humate were coagulated by adding 500 parts of an aqueous solution containing 0.399 gram-equivalent of aluminum chloride and 0.741 gram-equivalent of hydrochloric acid. After filtration, washing and drying, the stock was compounded and cured, following the procedure and recipe given in Example II. Optimum cure was attained in 50 minutes and gave the following properties:

Tensile strength _____p.s.i._ 3,340
300% modulus _____p.s.i._ 1,470
Elongation at break _____percent__ 535

EXAMPLE V

A butadiene-styrene rubber reinforced with an aluminum acid humate containing 80% hydrogen ion equivalents was prepared, following the general procedure of Example II, as follows: 2500 parts of the butadiene-styrene copolymer latex described in Example I and containing 480 parts of copolymer was mixed with 3155 parts of aqueous sodium humate, prepared as in Example I from humic acid of equivalent weight 168, said humate solution containing 268 parts of sodium humate. This is equivalent to 240 parts of humate calculated as the desired aluminum acid humate salt. After thorough mixing for 10-15 minutes, the latex and aluminum acid humate were coagulated by adding 500 parts of an aqueous solution containing 0.345 gram-equivalent of aluminum chloride and 1.38 gram-equivalents of hydrochloric acid. After filtration, washing and drying, the stock was compounded and cured, following the procedure and recipe given in Example II. This stock reached optimum cure in 50 minutes and had the following properties:

Tensile strength _____p.s.i._ 2,700
300% modulus _____p.s.i._ 1,530
Elongation at break _____percent__ 515

EXAMPLE VI

For comparison, a butadiene-styrene rubber reinforced with humic acid (100% hydrogen ion equivalent) was prepared following the general procedure of Examples II to V, as follows: 2200 parts of the butadiene-styrene copolymer latex described in Example I and containing 440 parts of copolymer (Mooney viscosity=50) was mixed with 2930 parts of aqueous sodium humate which contained 220 parts of humate as humic acid of equivalent weight 168, prepared as in Example I. After thorough mixing, the latex and humic acids were coagulated by adding 500 parts of hydrochloric acid containing 1.6 gram-equivalents of the acid. After filtration, washing and drying, the stock was compounded and cured, following the procedure and recipe given in Example II. This stock reached its optimum state of cure in 50 minutes and had the following properties:

Tensile strength _____p.s.i._ 2,460
300% modulus _____p.s.i._ 1,510
Elongation at break _____percent__ 440

A summary of the properties given in Examples II to V for rubbers reinforced with aluminum acid humates of varying percents of hydrogen ion equivalents, and a comparison with the straight humic acid of Example VI, is tabulated below:

Table I.—SBR Reinforced With Aluminum Acid Humates

| Percent H+ | Tensile, p.s.i. | 300% Modulus, p.s.i. | Elong., percent |
| --- | --- | --- | --- |
| 30 | 1,930 | 1,410 | 390 |
| 50 | 3,090 | 1,750 | 470 |
| 65 | 3,340 | 1,470 | 535 |
| 80 | 2,700 | 1,530 | 515 |
| 100 | 2,460 | 1,510 | 440 |

EXAMPLE VII

Natural rubber reinforced with barium acid humate containing 30% hydrogen ion equivalents was prepared, following the general procedure of Example II, as follows: 1468 parts of natural rubber latex containing 320 parts of rubber solids was mixed with 1666 parts of aqueous sodium humate, prepared as in Example I from humic acid of equivalent weight 168, said humate solution containing 142 parts of sodium humate. This is equivalent to 160 parts of humate calculated as the desired barium acid humate salt. After thorough mixing for 10-15 minutes, the latex and barium acid humate were coagulated by adding 500 parts of a solution containing 0.636 gram-equivalent of barium chloride and 0.272 gram-equivalent of hydrochloric acid. After filtration, washing and drying, the stock was compounded and cured, following the procedure and recipe given in Example II. Optimum cure was attained in 50 minutes and the vulcanizate had the following properties:

Tensile strength _____p.s.i._ 1,170
300% modulus _____p.s.i._ 690
Elongation at break _____percent__ 535

EXAMPLE VIII

Natural rubber reinforced with barium acid humate containing 65% hydrogen ion equivalents was prepared, following the general procedure of Example II, as follows: 1468 parts of natural rubber latex containing 320 parts of rubber solids was mixed with 1865 parts of aqueous sodium humate, prepared as in Example I from humic acid of equivalent weight 168, said humate solution containing 159 parts of sodium humate. This is equivalent to 160 parts of humate calculated as the desired barium acid humate salt. After thorough mixing for 10-15 minutes, the latex and barium acid humate were coagulated by adding 500 parts of a solution containing 0.356 gram-equivalent of barium chloride and 0.662 gram-equivalent of hydrochloric acid. After filtration, washing and drying, the stock was compounded and cured, following the procedure and recipe given in Example II. After 100 minutes:

Tensile strength _____p.s.i._ 2,730
300% modulus _____p.s.i._ 750
Elongation at break _____percent__ 720

These results were comparable with a control sample of natural rubber reinforced with carbon black, and superior to those observed using total humic acids or total barium humate.

In the fluid-bed air oxidation of coals, oxidation is preferably carried out at a temperature of about 250° C., although the temperature can be raised to 350° C. or even higher so long as the temperature remains below the coking temperature. The reaction time depends on both the temperature and the effectiveness of the fluidization, and in the absence of catalyst generally requires at least 150 hours. The weight of oxidized product generally comprises 60-80% of the weight of the coal charged, the oxidized product containing 70-90% of alkali-soluble humic acids.

The latex masterbatching procedure is readily adapted to the preparation of a variety of humate acid salts, and is a preferred technique herein. For example, lead acid humate may be combined with GR-S latex by adding a coagulating solution containing lead nitrate and nitric acid, followed by compounding and curing the filtered and dried product. Similarly, zinc acid humate masterbatch may be prepared using zinc chloride and hydrochloric acid; ferrous or ferric acid humate masterbatches from the iron chloride and hydrochloric acid; copper acid humate masterbatch from the copper sulfate and sulfuric acid; aluminum acid humate masterbatch from aluminum chloride or oxide and acid; and many other combinations of metal ion with an acid stronger than humic.

The best proportion of metal to hydrogen ion, in terms of optimum physical properties of the reinforced product, varies with the metal used, and may range from about 0.1 to about 0.8 equivalent of metal ion per humic equivalent, that is, per total equivalent of humic acid plus humate. In the case of calcium, aluminum and barium acid humates, for example, optimum results are observed using about 0.35 equivalent of metallic ion per humic equivalent, as shown in the attached drawing, with good results observed over a range of about 0.2 to 0.5 equivalent of metal.

As the amount of metal acid humate in the rubber stock increases, so do such properties as abrasion and tear resistance and modulus. These effects are characteristic of all reinforced rubbers. For practical reasons, a maximum of about 100 parts humate per 100 parts rubber solids is used, although more could be incorporated if it is desired to impart particular properties to the rubber. For different uses the proportion will vary. For example, a calcium acid humate range of 40–70 parts per 100 parts rubber would be used for tire tread stocks, whereas a humate range of 20–50 parts is preferable for carcass stocks. In general, about 10 to 100 parts of metal acid humate per 100 parts rubber gives effective reinforcement for both synthetic and natural rubber. The humate rubbers of this invention are particularly applicable to oil extension.

The principle of this invention has been explained and exemplified in a manner so that it can be readily practiced by those skilled in the art, such exemplification including what is considered to represent the best embodiment of the invention. Any modification or variation therefrom which conforms to the spirit of the invention is intended to be included within the scope of the appended claims.

That which is claimed is:

1. A vulcanizable rubber composition comprising a rubber selected from the group consisting of natural rubber, homopolymers of butadiene, isoprene, piperylene, 2,3-dimethylbutadiene and chloroprene, and copolymers of these dienes with styrene, isobutylene, diisobutylene, acrylonitrile, methyl methacrylate, methyl acrylate, methyl vinyl ether and methyl vinyl ketone, and as reinforcing agent, an effective proportion of a partial polyvalent metal salt of coal-derived humic acids, said partial salt containing about 50–80% hydrogen ion equivalents and about 20–50% polyvalent metal equivalents.

2. The composition of claim 1 wherein the polyvalent metal is an alkaline earth metal.

3. The composition of claim 1 wherein the polyvalent metal is calcium.

4. The composition of claim 1 wherein the polyvalent metal is aluminum.

5. The composition of claim 1 wherein the polyvalent metal is barium.

6. A vulcanizable rubber composition comprising a rubber selected from the group consisting of natural rubber, homopolymers of butadiene, isoprene, piperylene, 2,3-dimethylbutadiene and chloroprene, and copolymers of these dienes with styrene, isobutylene, diisobutylene, acrylonitrile, methyl methacrylate, methyl acrylate, methyl vinyl ether and methyl vinyl ketone, and as reinforcing agent, about 10–100 parts per 100 parts of rubber solids of a partial polyvalent metal salt of coal-derived humic acids, said humic acids having an equivalent weight of about 150–350, and said partial salt containing about 50–80% hydrogen ion equivalents and about 20–50% equivalents of a metal selected from the group consisting of calcium, aluminum and barium.

7. The composition of claim 6 wherein the rubber is a butadiene-styrene copolymer.

8. The method for producing a rubber reinforced with a partial salt of humic acids comprising the steps of preparing a rubber masterbatch by mixing a soluble salt of humic acids with the latex of a rubber selected from the group consisting of natural rubber, homopolymers of butadiene, isoprene, piperylene, 2,3-dimethylbutadiene and chloroprene, and copolymers of these dienes with styrene, isobutylene, diisobutylene, acrylonitrile, methyl methacrylate, methyl acrylate, methyl vinyl ether and methyl vinyl ketone, and precipitating said masterbatch by adding a polyvalent metal salt and an acid in sufficient proportions to form a partial polyvalent metal salt of humic acids having about 50–80% hydrogen ion equivalents and about 20–50% polyvalent metal equivalents.

References Cited in the file of this patent

UNITED STATES PATENTS 2,607,753     Adams  ------------------ Aug. 19, 1952

OTHER REFERENCES

Tibenham et al: "Industrial and Engineering Chemistry," April 1954, volume 46, No. 4, pages 824–828.